Sept. 10, 1946.  W. J. O'BRIEN  2,407,324
EQUI-SIGNAL RADIO BEACON SYSTEM
Original Filed March 2, 1942  3 Sheets-Sheet 1

INVENTOR
WILLIAM J. O'BRIEN,
BY
ATTORNEY.

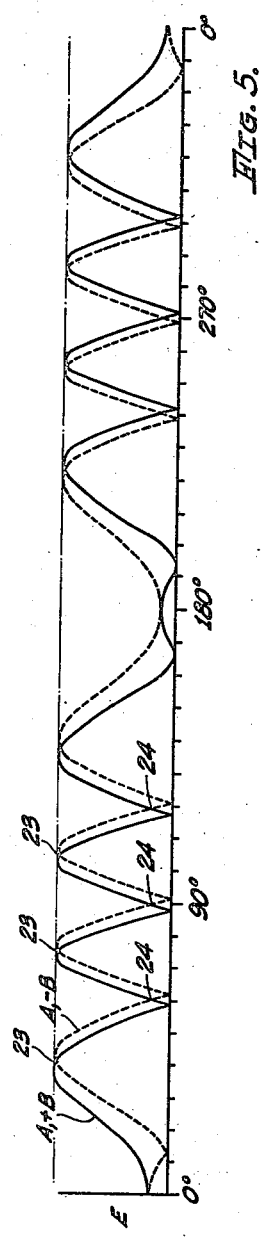
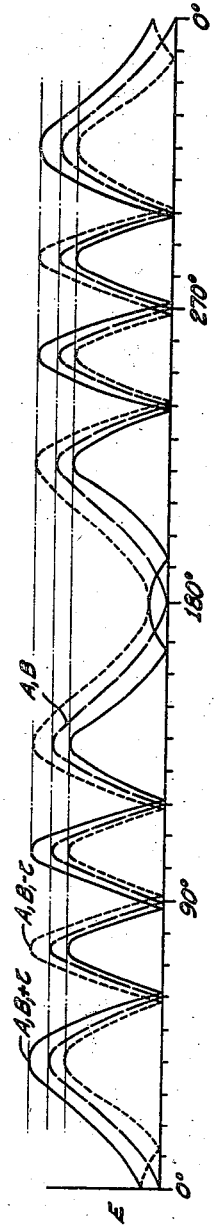
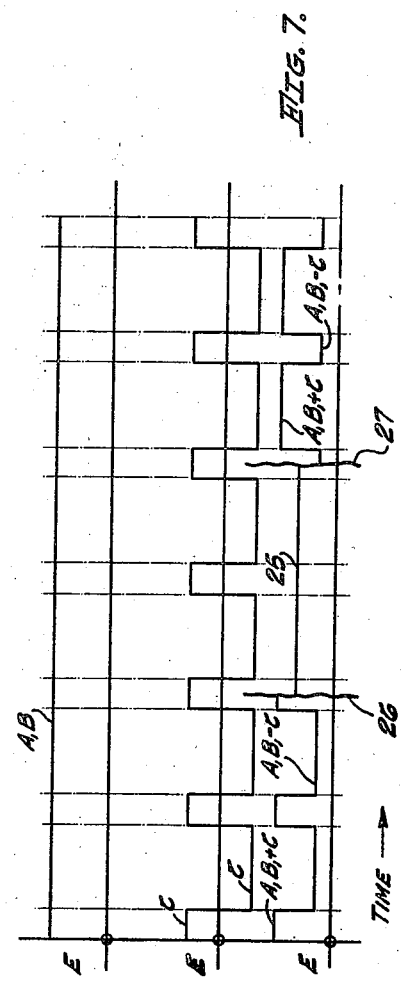
INVENTOR
WILLIAM J. O'BRIEN,
BY
ATTORNEY.

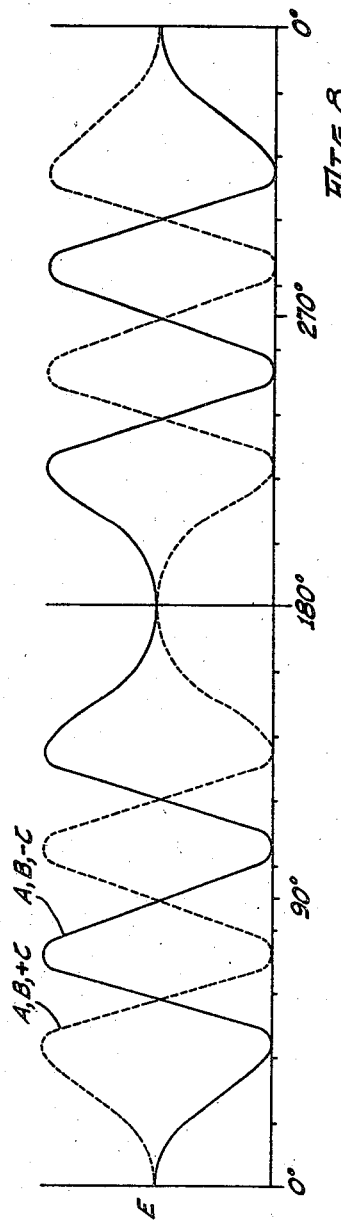
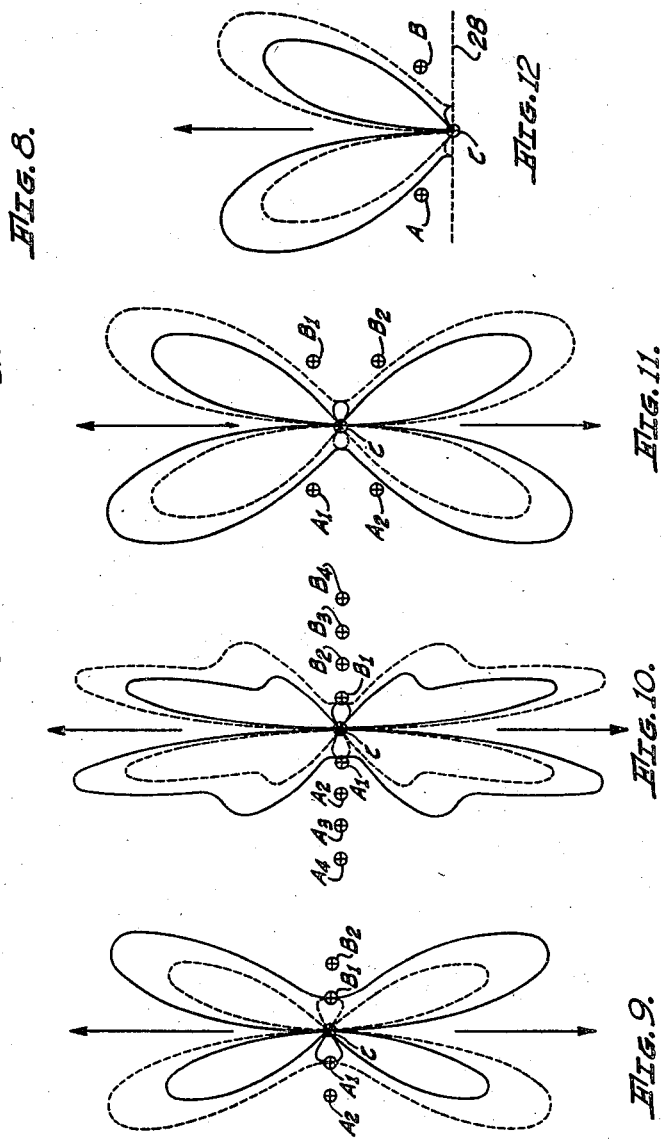
INVENTOR
WILLIAM J. O'BRIEN,
BY
*Harold W. Mattingly*
ATTORNEY.

Patented Sept. 10, 1946

2,407,324

UNITED STATES PATENT OFFICE 2,407,324

EQUISIGNAL RADIO BEACON SYSTEM

William J. O'Brien, London, England, assignor to The Decca Record Company, Limited, London, England, a corporation of Great Britain Original application March 2, 1942, Serial No. 432,948. Divided and this application November 8, 1943, Serial No. 509,444

7 Claims. (Cl. 250—11)

My invention relates to a radio beacon system and has particular reference to an equi-signal type of radio beacon which finds particular utility when employed as a navigation aid for vehicles and conveyances, particularly aircraft.

This is a division of my copending application Serial No. 432,948, filed March 2, 1942, and entitled "Equi-signal radio beacon systems."

The equi-signal type of radio beacon system is that which is at present employed in the United States Department of Commerce airways radio-range beacon for establishing the transcontinental air routes followed by the commercial air transport companies. This type of system generally comprises a group of radio transmission antennae so arranged and so operated that the course along which it is desired to navigate an aircraft comprises the locus of points of equal signal intensities as regards separate signals of like frequency emanated from the antennae. In general, these separate signals are reciprocally and distinguishably keyed "off" and "on," the conventional arrangement being that in which one signal is keyed with the international Morse code charnacter for A (· —) while the other is alternately keyed N (— ·). If the aircraft is "on course" the intensities of the two signals are equal and the off periods of one coincide with the on periods of the other so that a steady and continuous signal is received. If the plane is "off course," one of the signals will predominate over the other and the keying of the signals will be apparent. The direction in which the plane has drifted from the course is indicated by whether the A or N signal predominates.

The present systems while of great assistance in the navigation of aircraft, nevertheless are characterized by certain disadvantages and difficulties. For example, the present systems do not provide a sufficiently sensitive indication to permit their successful application to long range control, as for example, the guiding of bombing planes in war time to an objective to be bombed situated five or six hundred miles distant. The sensitivity of the present system can be increased by increasing the antenna spacing. There are, however, practical limitations on how far apart the antennae may be successfully spaced and, furthermore, an increase in antenna spacing likewise increases the number of equi-signal courses produced so that the danger of an aircraft becoming lost through inability to identify the course is correspondingly increased.

It is, therefore, an object of my invention to provide an equi-signal type of radio beacon system which overcomes the above noted disadvantages by providing for increased sensitivity of indication.

It is also an object of my invention to provide a radio beacon system of the character referred to in which the equi-signal courses are produced by periodically changing the relative phases of the transmitting antennae.

Other objects and advantages of my invention will be apparent from a study of the following specifications read in connection with the accompanying drawings, wherein:

Fig. 5 is a rectangular diagram similar to Fig. 2 but illustrating the effect of reducing the magnitude of the periodic phase shift which is applied to the alternately operating antenna;

Fig. 6 is a rectangular diagram similar to Fig. 5 but illustrating the effect of the introduction of a periodically reversing radiation from a central antenna;

Fig. 7 is a diagrammatic view illustrating the mode of operation of the three antennae to produce the field patterns illustrated in Fig. 6, and illustrating also the manner in which that mode of operation serves to provide an indication of the location of a vehicle with respect to the course intended to be followed;

Fig. 8 is a diagram similar to Fig. 6 and illustrating the effect of increasing the intensity of the radiation from the central antenna with respect to that produced by the other two antennae;

Fig. 9 is a polar diagram illustrating the field patterns produced by an antenna array comprising five antennae;

Fig. 10 is a polar diagram similar to Fig. 9 and illustrating the field strength pattern resulting from the use of nine antennae;

Fig. 11 is a polar diagram illustrating the field strength pattern produced by an antenna array comprising five antennae arranged to define a rectangle as distinguished from the straight line arrangement illustrated in Fig. 9; and Fig. 12 is a polar diagram illustrating the field pattern produced by an antenna array comprising three antennae and one reflector.

Figure 1:
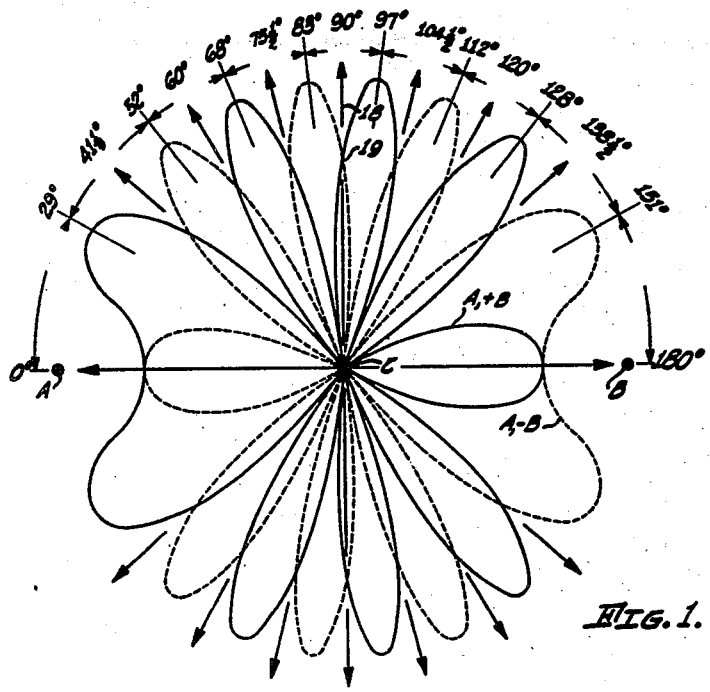
Fig. 1 is a polar diagram illustrating the signal intensities which are produced by two radio antennae, one operating continually and the other being so operated as to produce a recurring phase reversal.

Referring to the drawings, I have illustrated in Fig. 1 two radio transmission antennae A and B as being spaced from each other a known distance. Fig. 1 illustrates by means of the solid line curve A+B the field pattern which is produced when the antennae A and B are spaced apart a distance corresponding to two wavelengths and are operated as illustrated in Fig. 3 wherein antenna A is illustrated as being continuously operated, whereas antenna B is so operated as to produce a cyclic 180° phase reversal.

Figure 3:
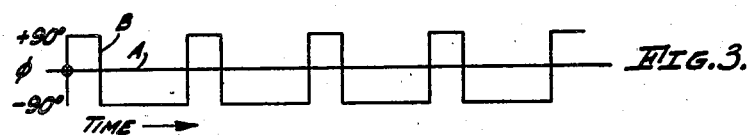
Fig. 3 is a diagrammatic view illustrating the mode of operation of the two antennae A and B.

As is shown in Fig. 3, this cycle is so arranged that the signal from antenna B leads the A signal by 90 electrical degrees for a relatively short period of time and then lags the A signal by 90 electrical degrees for a period of time substantially three times as long as the period in which it leads the A signal.

Figure 2:
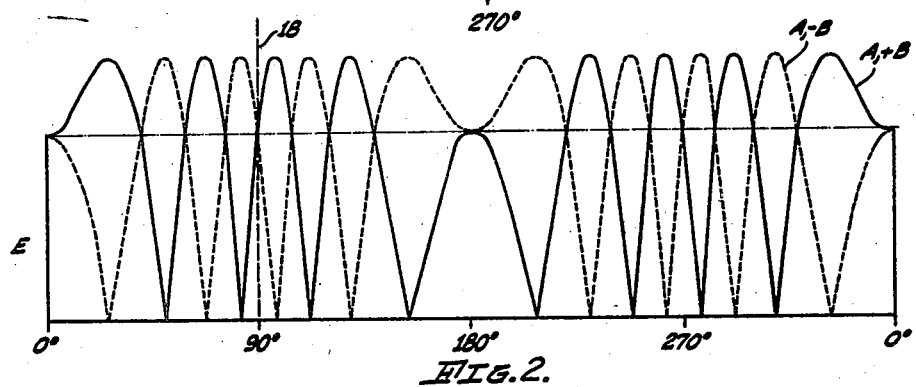
Fig. 2 is a diagram drawn on rectangular coordinates and reproducing the same relationships as are illustrated in the polar diagram of Fig. 1.

Figs. 1 and 2 each represent the field strength pattern produced by this mode of operation of the antennae A and B, Fig. 1, comprising a polar diagram of the field strength patterns, while Fig. 2 illustrates precisely the same patterns drawn on rectangular coordinates in which the relative intensities of the signals are plotted as ordinates and the angular position of the vehicle with respect to a given reference direction is plotted as abscissa.

The solid line curve in Figs. 1 and 2 identified by the reference character A+B represents the field strength pattern produced by the operation of antennae A and B during the time the B signal leads the A signal by 90°. The dotted line identified by the reference character A—B illustrates the field pattern produced during the time the B signal lags the A signal by 90°.

By so operating the antennae A and B, sixteen equi-signal courses are defined. These courses are indicated by the various radially disposed arrows shown in Fig. 1. If zero degrees is defined as the line extending from a point midway between antennae A and B and through antenna A, then the various equi-signal courses defined by this beacon system lie, respectively, at 0°, 41½°, 60°, 75½°, 90°, 104½°, 120° and 138½°, with the remaining eight similarly positioned about the remaining semi-circle.

Each of these courses comprises a radial line extending from the origin through a point of intersection of the A+B field pattern with the A—B field pattern. For example, the 90° course indicated by the arrow 18 is defined by a line extending from the origin through the point of intersection identified by the reference character 19.

Figure 4:
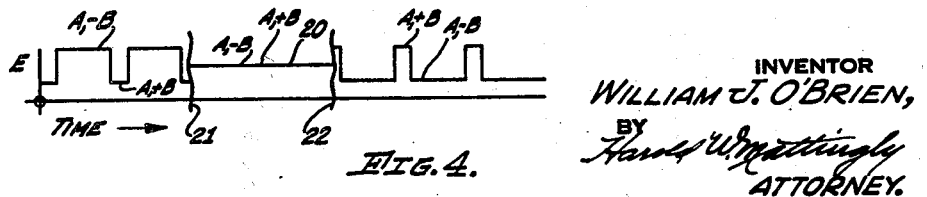
Fig. 4 is a digram illustrating the manner in which the operation of the antennae A and B as indicated by Fig. 3 serves to provide an indication of the location of a vehicle with respect to the course intended to be followed by that vehicle.

If a vehicle which is provided with suitable receiving apparatus proceeds along the 90° course, the signal received will comprise a steady tone such as that indicated by the straight horizontal line 20 in that portion of Fig. 4 which lies between the wavy break lines 21 and 22. If the aircraft wanders to the left of the 90° course, it will be noted that the A—B signal will predominate in intensity over the A+B signal so that there is produced a relative signal intensity such as that illustrated in Fig. 4 in that portion lying to the left of the wavy break line 21. It will be noted that the A—B signals have a duration roughly three times as long as the duration of the A+B signals so that the pilot obtains the impression of hearing a series of spaced dashes.

Similarly, if the vehicle wanders to the right of the 90° course, the A+B signals will predominate over the A—B signals so as to produce the impression of receiving a series of spaced dot signals. Thus the pilot will be apprised of whether or not he is following the 90° course or whether he has wandered either to the right or to the left of such course.

Attention is directed to the fact also that the beacon system above described provides an extremely acute angle at the intersection of the alternate field pattern which serves to establish the courses so that a relatively slight deviation of the vehicle from the selected course serves to produce a strong "off course" indication, thus permitting the pilot to guide the vehicle with extreme accuracy along the selected course.

Under certain circumstances it is desirable to provide an even greater degree of accuracy and sensitivity in the indication than is possible with the system illustrated. An increase in accuracy and sensitivity may be obtained by providing a beacon system of the character disclosed in Fig. 5.

Fig. 5 is a rectangular diagram illustrating alternate field patterns produced by antennae spaced two wavelengths apart and with one antenna operated continuously while the other antenna is subjected to a recurring phase shift of 30° between conditions of 165° lag and 165° lead. The solid line curve in Fig. 5 illustrates the field strength pattern produced during the time the energy radiated from antenna B leads that from antenna A by 165° and the dotted line curve illustrates the field pattern produced when the phase angle between these two signals represents a lag of 165°.

It will be noted that the system operates to define sixteen equi-signal courses as does the system disclosed in Figs. 1, 2 and 3. However, the sensitivity has been increased along eight of these sixteen courses at the expense of the sensitivity along the remaining eight. The equi-signal courses established by the intersections identified by the reference character 23 in Fig. 5 exhibit a much lower sensitivity than do the courses defined by the intersections 24.

Another advantage results from the employment of the system illustrated in Fig. 5. The solid line curve and the dotted line curve closely parallel each other so that at any "off course" location the difference in signal intensities resulting from the periodic operation of antenna B is limited to a reasonably small value. This permits the receiving equipment employed in the vehicle to be operated with a relatively high amplification to provide an increased sensitivity in the region of the equi-signal course without the danger of over-loading the receiving equipment when the plane wanders from the defined course.

Figs. 6 and 7 disclose a modification of the system illustrated in Fig. 5 by providing for the desired increase in sensitivity and the desired limitation upon the maximum difference in signal intensities as the vehicle wanders from the defined course without giving rise to the danger of a confusion between courses. This is for the reason that the system illustrated in Figs. 6 and 7 while employing an antenna spacing of two wavelengths, nevertheless operates to define only eight equi-signal courses instead of the sixteen which characterized the previously described modifications of my invention.

The dashed line in Fig. 6 illustrates the field pattern produced by a continuous operation of two antennae spaced two wavelengths apart with the energy radiated from these antennae in phase opposition to each other. The solid line in Fig. 6 illustrates the field strength pattern resulting from introducing radiation from a centrally positioned antenna C, which radiation is so phased as to lead the radiation from antenna A by 90 electrical degrees. Similarly, the dotted line curve in Fig. 6 illustrates the field pattern resulting from so operating antenna C as to cause the signals to lag the A signals by 90°.

It will be noted that if the solid line and dotted line patterns are produced alternately as by periodically reversing the phase of antenna C, there are defined eight equi-signal courses which are characterized by high sensitivity and accuracy. It will be further noted that since the solid and dotted curves parallel each other, the difference in signal intensity resulting from a movement of the vehicle to one side of the selected course will be limited to a reasonable maximum.

Fig. 7 is intended to illustrate the mode of operation of the antennae to produce this type of field strength pattern and illustrates also the manner in which the signals provide an indication to the pilot of the vehicle as to his location with respect to a selected course. By referring to the upper portion of Fig. 7, it will be noted that antennae A and B are operated continuously, whereas antenna C is so operated as to have its phase periodically reversed. This periodic operation of antenna C is so arranged that the periods of operation in one phase are substantially three times as long as the periods of operation in the other phase.

Along the equi-signal course the signals resulting from each of the two types of operation of antenna C will be equal so that the signal heard by the pilot of the vehicle will be such as that represented by the straight line 25 in Fig. 7. If, on the other hand, the vehicle wanders to one side of the selected course, the signals resulting from operating antenna C in such fashion as to lead the signals emanated from antenna A will predominate over those resulting from the opposite operation of antenna C. This predominance is illustrated in the lower portion of Fig. 7 in that part disposed to the left of the wavy break line 26. This produces a signal which the pilot of the vehicle hears and interprets as comprising a series of spaced dot signals.

When the vehicle wanders to the opposite side of the course, the conditions just described are reversed so that the signals of longer duration predominate over the signals of short duration as is illustrated by that part of Fig. 7 lying to the right of the wavy break line 27. This produces a signal which the pilot interprets as comprising a series of spaced dash signals.

Fig. 8 discloses a field strength pattern which is produced by the system described in connection with Figs. 6 and 7 when the intensity of signals radiated from the antennae is so adjusted that the A and B signals are equal while the signals from C antenna are twice as strong as the signals from the A or B antenna.

In the event that it is desired to define and use but one or two equi-signal courses, the sensitivity and accuracy of the indication along such courses can be materially increased by employing an antennae array. Figs. 9, 10 and 11 comprise polar diagrams illustrating the different types of field strength patterns which may be obtained by the use of the types of antennae arrays illustrated therein. In each of these figures the A and B antennae are continuously operated while the centrally positioned C antenna is subjected to a periodic phase reversal with the result that the field strength pattern periodically shifts from the form illustrated by the solid lines in these figures to the form illustrated by the dotted lines. The equi-signal courses extend in the direction indicated by the arrows in these figures and it is apparent from an inspection of these figures that the angle at which the two field strength patterns intersect each other is extremely small.

In the form of the invention illustrated in Fig. 9, five antennae are employed; i. e., one centrally positioned antenna C, two A antennae (A1 and A2) positioned to one side of antenna C, and two B antennae (B1 and B2) positioned on the opposite side of antenna C. The antennae are spaced from each other a distance corresponding to one-half wavelength. The signals emanated from the A antennae are in phase opposition to the signals emanated from the B antennae. The periodic phase reversal of antenna C is so arranged that the C signals first lead the A signals by 90° and then lag the A signals by 90°. The signal intensities are so adjusted that the antenna current in antennae A2 and B2 is substantially one-half the antenna current in antennae A1 and B1, while the current in antenna C is adjusted to approximately one-sixth the current in antennae A1 and B1.

In the form of the invention illustrated in Fig. 10 four A antennae are employed, A1, A2, A3 and A4 and four B antennae are also employed, B1, B2, B3 and B4. The nine antennae illustrated are spaced one-half wavelength from each other and the phase relations are the same as described in connection with Fig. 9.

The signal intensities are so adjusted that the antenna currents in A2 and B2 are substantially one-half the antenna currents in A1 and B1, the antenna currents in A3 and B3 are substantially one-third the antenna currents in A1 and B1, the antenna currents in A4 and B4 are substantially one-fourth the antenna current in A1 and B1, and the current in antenna C is adjusted to approximately one-tenth the current in antennae A1 and B1.

In the form of the invention illustrated in Fig. 11 antennae A1 and A2 are spaced to the left of antenna C a distance equal to one-half wavelength and are spaced apart a distance of one-half wavelength. Similarly, antennae B1 and B2 are positioned to the right of antenna C a distance equal to one-half wavelength and are separated from each other by a distance equal to one-half wavelength. Antennae A1—A2 and B1—B2 are symmetrically positioned on opposite sides of a longitudinal center line extending through antenna C.

Antennae A1 and B2 are operated in phase opposition to antennae A2 and B1, while antenna C is subjected to a periodic phase reversal between a positive phase quadrature relationship and a negative phase quadrature relationship with antennae A1 and B2. The antenna currents in the A and B antennae are equal and are preferably substantially ten times the current in antenna C.

Fig. 12 illustrates a form of the invention which is adapted to produce a single equi-signal course. The arrangement is precisely the same as that described in connection with Fig. 11 with the exception that a suitable reflector 28 is substituted for antennae A2 and B2, the reflector 28 extending along the longitudinal center line which passes through antenna C. The field strength pattern produced is identical to the upper half of the field strength pattern produced by the system of Fig. 11.

In the foregoing I have described a number of radio beacon systems each having the common object of providing a simple, dependable system by means of which a vehicle such as an aircraft or ship can be guided to a selected destination.

In the foregoing I have illustrated and described an improved form of equi-signal radio beacon system which operates to produce an indication of the location of the vehicle with respect to one course selected from a plurality of available courses. It will be observed that the sensitivity of indication which is provided is extremely high so that a pilot may guide his vehicle along the selected course with great accuracy.

While I have shown and described the preferred embodiment of my invention, I do not desire to be limited to any of the details of construction shown or described herein, except as defined in the appended claims.

I claim:

1. The method of producing a radio frequency equi-signal surface for guiding mobile vehicles which consists in simultaneously radiating radio frequency signals of like frequency from three aligned points spaced from each other, adjusting the phase of the signals radiated from the end ones of said three points to be in phase opposition to each other, periodically reversing the phase of the signals radiated from the center one of said three points from substantially a leading phase quadrature relation to one of said other signals to substantially a lagging phase quadrature relation to said one other signal, and effecting said periodic phase reversal in a repeating cycle in which the time duration of the periods of one of said phase relations is materially different than the duration of the periods of the other of said phase relations.

2. A radio beacon system comprising a central antenna and a plurality of other antennae disposed in a line on opposite sides of said central antenna and spaced uniform distances from each other, means for radiating from each of the antennae positioned on one side of said central antenna radio frequency signals of a given frequency and of like phase and having relative strengths inversely proportional to the spacing of said antennae from said central antenna, means for radiating from each of the antennae positioned on the other side of said central antenna radio frequency signals of said given frequency and of like phase opposite to the phase of the signals radiated from the antennae positioned on said one side of said central antenna and having relative strengths inversely proportional to the spacing of said antennae from said central antenna, means for radiating from said central antenna radio frequency signals of said given frequency and bearing a phase quadrature relation to the signals radiated from said other antennae, and means for periodically reversing the phase of the signals radiated from said central antenna.

3. The method of producing radio frequency equi-signal surfaces for guiding mobile vehicles which consists in simultaneously radiating radio frequency signals of like frequency from three aligned points spaced from each other by equal distances, adjusting the phase of the signals radiated from the end ones of said three points to effect a desired orientation of the equi-signal surfaces, and periodically reversing the phase of the signals radiated from the center one of said three points from substantially an in phase relation to the sum of the vectors of the end ones of said three points to substantially a phase opposition relation thereto.

4. A radio beacon system comprising a central antenna and a plurality of other antennae disposed in a line on opposite sides of said central antenna and spaced uniform distance of substantially one-half wavelength from each other, means for radiating from each of the antennae positioned at each side of said central antenna, a radio frequency signal of a given frequency and having relative strengths inversely proportional to the spacing of said antenna from said central antenna and so phased as to define a surface in space comprising a locus of points of substantially zero field strength compared to the surface of maximum field strength, means for radiating from said central antenna radio frequency signals of said given frequency and bearing a substantially in phase relation to the vector sum of any pair of two corresponding outer antennae, and means for periodically reversing the phase of the signal radiated from said central antenna.

5. The method of producing a radio frequency equi-signal surface for guiding mobile vehicles which consists in simultaneously radiating radio frequency signals of like frequency from three aligned points spaced from each other at least one wavelength of said signals, and periodically reversing the phase of the signals radiated from the center one of said three points.

6. The method of producing a radio frequency equi-signal surface for guiding mobile vehicles which consists in simultaneously radiating radio frequency signals of like frequency from three aligned points spaced from each other at least one wavelength of said signals, and periodically reversing the phase relation between the signals radiated from the center one of said three points and the signals radiated from the other two points.

7. The method of producing a radio frequency equi-signal surface for guiding mobile vehicles which consists in simultaneously radiating radio frequency signals of like frequency from three aligned points spaced from each other at least one wavelength of said signals, periodically reversing the phase relationship between the signals radiated from the center one of said three points and the signals radiated from the other two points, and maintaining between the signals radiated from said center point and the vector sum of the signals radiated from said other two points a phase angle equal to any whole number multiple of 180 degrees.

WILLIAM J. O'BRIEN.